US011953137B2

(12) United States Patent
Kikuyama et al.

(10) Patent No.: US 11,953,137 B2
(45) Date of Patent: Apr. 9, 2024

(54) ROTARY JOINT

(71) Applicant: NIPPON PILLAR PACKING CO., LTD., Osaka (JP)

(72) Inventors: Yoshinori Kikuyama, Osaka (JP); Osamu Suzuki, Osaka (JP); Takashi Nishi, Osaka (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 888 days.

(21) Appl. No.: 16/978,383

(22) PCT Filed: Dec. 12, 2018

(86) PCT No.: PCT/JP2018/045701
§ 371 (c)(1),
(2) Date: Sep. 4, 2020

(87) PCT Pub. No.: WO2019/171697
PCT Pub. Date: Sep. 12, 2019

(65) Prior Publication Data
US 2021/0317937 A1    Oct. 14, 2021

(30) Foreign Application Priority Data
Mar. 6, 2018    (JP) .................................. 2018-039583

(51) Int. Cl.
*F16L 39/04*    (2006.01)
*F16J 15/324*    (2016.01)
(Continued)

(52) U.S. Cl.
CPC ............. *F16L 39/04* (2013.01); *F16J 15/324* (2013.01); *F16J 15/3452* (2013.01); *B24B 55/02* (2013.01)

(58) Field of Classification Search
CPC . F16L 39/04; F16L 39/06; F16L 27/08; F16L 27/0828; F16L 27/087
See application file for complete search history.

(56) References Cited

U.S. PATENT DOCUMENTS 6,390,478 B1 *  5/2002  Sigmundstad ........ F16L 27/087
                                                                277/362
6,401,746 B1 *  6/2002  Scott, Jr. ................. F16L 39/04
                                                                285/121.6

(Continued)

FOREIGN PATENT DOCUMENTS

EP   2799752 A1 * 11/2014 .............. F16L 39/06
JP   2001141150 A *  5/2001 ............ F16L 27/087
(Continued)

OTHER PUBLICATIONS

International Search Report dated Feb. 26, 2019 issued in corresponding PCT/JP2018/045701 application (1 page).

*Primary Examiner* — Matthew Troutman
*Assistant Examiner* — Fannie C Kee
(74) *Attorney, Agent, or Firm* — Millen, White, Zelano & Branigan P.C.; William F. Nixon

(57) ABSTRACT

A rotary joint capable of lubricating a sealing surface of a mechanical seal forming a fluid passage through which a gas flows using a liquid even when the liquid flows through only one fluid passage is disclosed. A rotary joint includes a plurality of mechanical seals provided in an axial direction in an annular space between a case body and a shaft body to form a first intermediate flow passage that connects a first outer flow passage and a first inner flow passage of a first fluid passage through which a liquid flows to each other and form a second intermediate flow passage that connects a second outer flow passage and a second inner flow passage of a second fluid passage through which a gas flows to each other.

8 Claims, 5 Drawing Sheets

(51) Int. Cl.
    *F16J 15/34* (2006.01)
    *B24B 55/02* (2006.01)

(56) References Cited

U.S. PATENT DOCUMENTS

| | | | |
|---|---|---|---|
| 6,508,472 B2 * | 1/2003 | Omiya | F16L 27/087 |
| | | | 277/408 |
| 2002/0017785 A1 * | 2/2002 | Omiya | F16L 39/04 |
| | | | 285/121.3 |
| 2008/0061514 A1 | 3/2008 | Suzuki | |
| 2008/0113537 A1 * | 5/2008 | Imai | F16L 39/06 |
| | | | 439/165 |
| 2016/0258564 A1 | 9/2016 | Fukumoto et al. | |
| 2017/0051857 A1 | 2/2017 | Sakakura et al. | |
| 2017/0074445 A1 * | 3/2017 | Kikuyama | F16L 39/04 |
| 2018/0058593 A1 * | 3/2018 | Suzuki | F16L 39/06 |

FOREIGN PATENT DOCUMENTS

| | | | | |
|---|---|---|---|---|
| JP | 2002005380 A | * | 1/2002 | F16L 27/087 |
| JP | 2002-174379 A | | 6/2002 | |
| JP | 2004-19912 A | | 1/2004 | |
| JP | 2004316775 A | * | 11/2004 | F16L 27/087 |
| JP | 2011127725 A | | 6/2011 | |
| WO | 2006/061997 A1 | | 6/2006 | |
| WO | 2016/143480 A1 | | 9/2016 | |

* cited by examiner

ROTARY JOINT

TECHNICAL FIELD

The present invention relates to a rotary joint.

BACKGROUND ART

A rotary joint is used to connect a flow passage of a fixed side member and a flow passage of a rotating side member to each other. For example, in a chemical mechanical polishing device (CMP device) used to perform surface polishing treatment of a semiconductor wafer, liquid such as polishing liquid, washing water, pure water, cooling water, or polishing residual liquid, or gas such as pressurizing air, or air blowing air flows as a sealed fluid between a rotating side member (a turntable or a top ring) and a fixed side member (a main body of the CMP device) supporting the rotating side member. A plurality of independent fluid passages is used for a joint portion that connects between the rotating side member and the fixed side member to allow the sealed fluid to flow between the rotating side member and the fixed side member without mixing. In this regard, for example, a multi-port type rotary joint disclosed in Patent Literature 1 is used as the joint portion.

FIG. 5 is a cross-sectional view illustrating a conventional rotary joint. This rotary joint 80 includes a tubular case body 81, a shaft body 82 rotatably provided in the case body 81, and a plurality of mechanical seals 86 provided in an annular space 85 between the case body 81 and the shaft body 82. Each of the mechanical seals 86 includes a first seal ring 87 attached to the case body 81, a second seal ring 88 that rotates integrally with the shaft body 82, and a plurality of coil springs 89. In addition, a plurality of (three in the illustrated example) independent fluid passages 90 is provided in the rotary joint 80.

The shaft body 82 has a shaft main body 83 and a sleeve 84 fit to an outer circumferential side of the shaft main body 83. The sleeve 84 and the second seal ring 88 of the mechanical seal 86 are alternately disposed along an axial direction, and can rotate integrally with the shaft main body 83.

An outer flow passage 91 open on an outer circumferential side and an inner circumferential side is formed in the case body 81. Further, an inner flow passage 92 which is open on the outer circumferential side is formed in the shaft body 82. The inner flow passage 92 includes a flow passage hole 92a formed in the shaft main body 83 and a through-hole 92b formed in the sleeve 84. The through-hole 92b is connected to the flow passage hole 92a and serves as an opening hole of the inner flow passage 92 on the outer circumferential side.

One outer flow passage 91 and one inner flow passage 92 are open at the same height position in the axial direction, and one independent fluid passage 90 includes the outer flow passage 91 and the inner flow passage 92. For this reason, the mechanical seals 86 forming the plurality of fluid passages 90 in the axial direction are provided in the annular space 85. In more detail, an annual intermediate flow passage 93 connecting the inner flow passage 92 (through-hole 92b) and the outer flow passage 91 is formed between second seal rings 88 and 88 adjacent to each other with the sleeve 84 interposed therebetween and between first seal rings 87 and 87 adjacent to each other with the sleeve 84 interposed therebetween.

The coil spring 89 of the mechanical seal 86 presses the first seal ring 87 in the axial direction with respect to the second seal ring 88, and the first seal ring 87 comes into contact with the second seal ring 88 adjacent thereto in the axial direction to prevent a sealed fluid from leaking from between surfaces coming into contact with each other. In other words, a part of an annular side surface of the first seal ring 87 serves as a first sealing surface 87a, and a part of an annular side surface of the second seal ring 88 serves as a second sealing surface 88a coming into sliding contact with the first sealing surface 87a.

By the above configuration, the shaft main body 83, the sleeve 84, and the second seal ring 88 may integrally rotate with respect to the case body 81, and the second seal ring 88 corresponding to a rotation side comes into sliding contact with the first seal ring 87 corresponding to a stationary side to exhibit a function as the mechanical seal 86. In this way, it is possible to form the independent fluid passage 90.

The plurality of fluid passages 90 includes a first fluid passage 90A for supplying a liquid such as cooling water to the turntable, etc., a second fluid passage 90B for supplying gas such as pressurized air to the turntable, etc., and a third fluid passage 90C for collecting the liquid supplied to the turntable, etc. and discharging the collected liquid to the outside.

The first fluid passage 90A through which the liquid flows is open on one axial side (upper side in the figure) of an outer periphery of the case body 81. In this way, the liquid passes through an intermediate flow passage 93A formed between two mechanical seals 86A and 86B disposed on the upper side in the figure and an annular space of the first and second seal rings 87 and 88 on the outer circumferential side in each of the mechanical seals 86A and 86B from the outer flow passage 91 of the first fluid passage 90A, and is supplied to the inner flow passage 92 indicated by a solid line on the left side of the shaft body 82 in the figure.

The third fluid passage 90C through which the liquid flows is open on the other axial side (lower side in the figure) of the outer periphery of the case body 81. In this way, the liquid passes through an intermediate flow passage 93C formed between two other mechanical seals 86C and 86D disposed on the lower side of the figure, an annular space of the first and second seal rings 87 and 88 on the outer circumferential side in each of the mechanical seals 86C and 86D, and the outer flow passage 91 of the third fluid passage 90C from the inner flow passage 92 illustrated on the right side of the shaft body 82 in the figure, and is discharged to the outside of the case body 81.

The second fluid passage 90B through which a gas flows is open between the first fluid passage 90A and the third fluid passage 90C on the outer periphery of the case body 81. In this way, the gas passes through an intermediate flow passage 93B formed between the two mechanical seals 86B and 86C from the outer flow passage 91 of the second fluid passage 90B, and is supplied to the inner flow passage 92 indicated by a broken line on the left side of the shaft body 82 in the figure.

As described above, the first and second sealing surfaces 87a and 88a of each of the two mechanical seals 86B and 86C forming the intermediate flow passage 93B of the second fluid passage 90B through which a gas flows are lubricated by the liquid flowing through the first and third fluid passages 90A and 90C.

CITATION LIST

Patent Literature

Patent Literature 1: JP 2002-174379 A

SUMMARY OF INVENTION

Technical Problem

In the conventional rotary joint 80, in order to lubricate the first and second sealing surfaces 87a and 88a of the mechanical seals 86B and 86C forming the second fluid passage 90B through which a gas flows, it is necessary to provide the outer flow passage 91 of each of the first and third fluid passages 90A and 90C through which the liquid flows on both axial sides of the outer flow passage 91 of the second fluid passage 90B in the case body 81. For this reason, the conventional rotary joint has a problem that unless at least two fluid passages through which the liquid flows are provided, the sealing surface of the mechanical seal forming the fluid passage through which the gas flows may not be lubricated.

The invention has been made in view of such circumstances, and an object of the invention is to provide a rotary joint that can lubricate a sealing surface of a mechanical seal forming a fluid passage through which a gas flows using only one fluid passage through which a liquid flows.

Solution to Problem

A rotary joint of the invention is a rotary joint including a first fluid passage through which a liquid flows and a second fluid passage through which a gas flows, the rotary joint further including a tubular case body formed by each of a first outer flow passage through which a liquid flows and a second outer flow passage through which a gas flows opening on an inner circumferential side, a shaft body provided to be relatively rotatable in the case body and formed by each of a first inner flow passage through which a liquid flows and a second inner flow passage through which a gas flows opening on an outer circumferential side, and a plurality of mechanical seals provided in an axial direction in an annular space between the case body and the shaft body to form a first intermediate flow passage that connects the first outer flow passage and the first inner flow passage to each other and configure the second fluid passage by forming a second intermediate flow passage that connects the second outer flow passage and the second inner flow passage to each other, in which each of the mechanical seals includes a first seal ring which is attached to the case body and on which a first sealing surface is formed, and a second seal ring which is attached to the shaft body and on which a second sealing surface coming into sliding contact with the first sealing surface is formed, the first fluid passage includes the first outer flow passage and the first inner flow passage opening at mutually different positions in the axial direction with the second intermediate flow passage interposed therebetween, and the first intermediate flow passage connecting an opening of the first outer flow passage and an opening of the first inner flow passage to each other, and the first intermediate flow passage is formed such that a liquid flowing through the first intermediate flow passage lubricates first and second sealing surfaces of the mechanical seals forming the second intermediate flow passage.

According to the rotary joint configured as described above, in the first fluid passage through which the liquid flows, the opening of the first outer flow passage on the case body side and the opening of the first inner flow passage on the shaft body side are open at mutually different positions in the axial direction with the second intermediate flow passage of the second fluid passage through which the gas flows interposed therebetween. Further, the first intermediate flow passage connecting the opening of the first outer flow passage and the opening of the first inner flow passage to each other is formed such that the liquid flowing through the first intermediate flow passage lubricates the first and second sealing surfaces of the mechanical seal forming the second intermediate flow passage. In this way, it is possible to lubricate the first and second sealing surfaces of the mechanical seal forming the second fluid passage (the second intermediate flow passage) through which the gas flows using the liquid flowing through one first fluid passage (first intermediate flow passage).

The first intermediate flow passage may include a first annular flow passage formed using some of the plurality of mechanical seals in the annular space to communicate with the opening of the first outer flow passage, a second annular flow passage formed using some other mechanical seals among the plurality of mechanical seals in the annular space to communicate with the opening of the first inner flow passage, and a connecting flow passage connecting the first annular flow passage and the second annular flow passage to each other.

In this case, it is possible to form the first intermediate flow passage by a simple configuration in which the first annular flow passage communicating with the opening of the first outer flow passage and the second annular flow passage communicating with the opening of the first inner flow passage using the connecting flow passage.

It is preferable that a plurality of second outer flow passages is formed in the axial direction in the case body, the same number of second inner flow passages as the number of second outer flow passages are formed in the shaft body, the plurality of mechanical seals includes a mechanical seal that forms the second intermediate flow passage connecting the second outer flow passages and the second inner flow passages one by one in the annular space to configure a plurality of second fluid passages, the first outer flow passage and the first inner flow passage are open at mutually different positions in the axial direction with the plurality of second intermediate flow passages interposed therebetween, and the first intermediate flow passage is formed such that a liquid flowing through the first intermediate flow passage lubricates first and second sealing surfaces of the mechanical seal forming the plurality of second intermediate flow passages.

In this case, in the first fluid passage through which the liquid flows, the opening of the first outer flow passage on the case body side and the opening of the first inner flow passage on the shaft body side are open at mutually different positions in the axial direction with the second intermediate flow passages of the plurality of second fluid passages through which the gas flows interposed therebetween. Further, the first intermediate flow passage connecting the opening of the first outer flow passage and the opening of the first inner flow passage to each other is formed such that the liquid flowing through the first intermediate flow passage lubricates first and second sealing surfaces of the mechanical seal forming the plurality of second intermediate flow passages. In this way, it is possible to lubricate the first and second sealing surfaces of the mechanical seal forming the plurality of second fluid passages (second intermediate flow passage) through which the gas flows using the liquid flowing through one first fluid passage (first intermediate flow passage).

It is preferable that the first intermediate flow passage includes a first annular flow passage formed using some of the plurality of mechanical seals in the annular space to communicate with the opening of the first outer flow passage, a second annular flow passage formed using some other mechanical seals among the plurality of mechanical seals in the annular space to communicate with the opening of the first inner flow passage, and a connecting flow passage connecting the first annular flow passage and the second annular flow passage to each other, and the connecting flow passage includes a third annular flow passage formed using the mechanical seal forming the plurality of second inner flow passages between the first annular flow passage and the second annular flow passage of the annular space, and a plurality of flow passage holes formed in the case body to connect the first annular flow passage and the second annular flow passage through the third annular flow passage.

In this case, since the liquid flowing through the connecting flow passage passes through each third annular flow passage formed using the mechanical seal forming the plurality of second inner flow passages, it is possible to reliably lubricate first and second sealing surfaces of the mechanical seal disposed in the middle of the connecting flow passage.

It is preferable that the first outer flow passage is a supply flow passage that supplies a liquid into the case body from an outside, the first inner flow passage is a discharge flow passage that discharges a liquid from an inside of the shaft body to an outside, and the case body and the shaft body are disposed with the axial direction as a vertical direction such that the opening of the first outer flow passage is located below the opening of the first inner flow passage.

In this case, the liquid flowing through the first fluid passage is supplied from the first outer flow passage located on the lower side in the axial direction and discharged to the outside from the first inner flow passage located on the upper side in the axial direction. In this instance, the liquid flowing into the first intermediate flow passage from the opening of the first outer flow passage is guided to the opening of the first inner flow passage by successively passing through the vicinity between the first and second sealing surfaces of each of the mechanical seals forming the plurality of second intermediate flow passages, respectively. In this way, generation of an air pocket near a part between the first and second sealing surfaces of each of the mechanical seals can be inhibited, and thus it is possible to suppress insufficient lubrication between the first and second sealing surfaces.

It is preferable that a third inner flow passage serving as a supply flow passage that supplies a liquid into the shaft body from the outside is formed in the shaft body to open on an outer circumferential side, a third outer flow passage serving as a discharge flow passage that discharges a liquid from the inside of the case body to the outside is formed in the case body to open on an inner circumferential side, the plurality of mechanical seals includes a mechanical seal that forms a third intermediate flow passage connecting the third outer flow passage and the third inner flow passage to each other in the annular space to configure a third fluid passage, and the third inner flow passage is open at a position on an upper side of the opening of the first inner flow passage in the axial direction in the shaft body.

In this case, the opening of the third inner flow passage is located on the upper side of the opening of the first inner flow passage in the axial direction. Thus, for example, when the third inner flow passage is dug from an upper end in the axial direction to a lower end in the axial direction of the shaft body, the third inner flow passage may not be deeply dug to a lower side of an opening position of the first inner flow passage. For this reason, the third inner flow passage can be easily processed.

It is preferable that a branch flow passage branching from an intermediate portion of the third inner flow passage and communicating with an upper end portion of the third intermediate flow passage in the axial direction is formed in the shaft body.

In this case, the liquid flowing through the third inner flow passage is supplied to the upper end portion of the third intermediate flow passage in the axial direction via the branch flow passage from the intermediate portion of the third inner flow passage, and guided to the third outer flow passage by passing through the vicinity of a part between the first and second sealing surfaces of the mechanical seal forming the upper end portion in the axial direction. In this way, it is possible to suppress generation of an air pocket in the vicinity of the part between the first and second sealing surfaces of the mechanical seal forming the upper end portion of the third intermediate flow passage in the axial direction, and thus it is possible to suppress insufficient lubrication between the first and second sealing surfaces.

Advantageous Effects of Invention

According to the rotary joint of the invention, even when there is only one fluid passage through which the liquid flows, the sealing surface of the mechanical seal forming the fluid passage through which the gas flows can be lubricated using the liquid.

BRIEF DESCRIPTION OF DRAWINGS

FIG. 2 is an enlarged cross-sectional view illustrating an upper side of the rotary joint;

FIG. 4 is a cross-sectional view illustrating a rotary joint according to a second embodiment of the invention.

DESCRIPTION OF EMBODIMENTS

Next, preferred embodiments of the invention will be described with reference to the accompanying drawings.

First Embodiment

<Overall Configuration>

Figure 1:
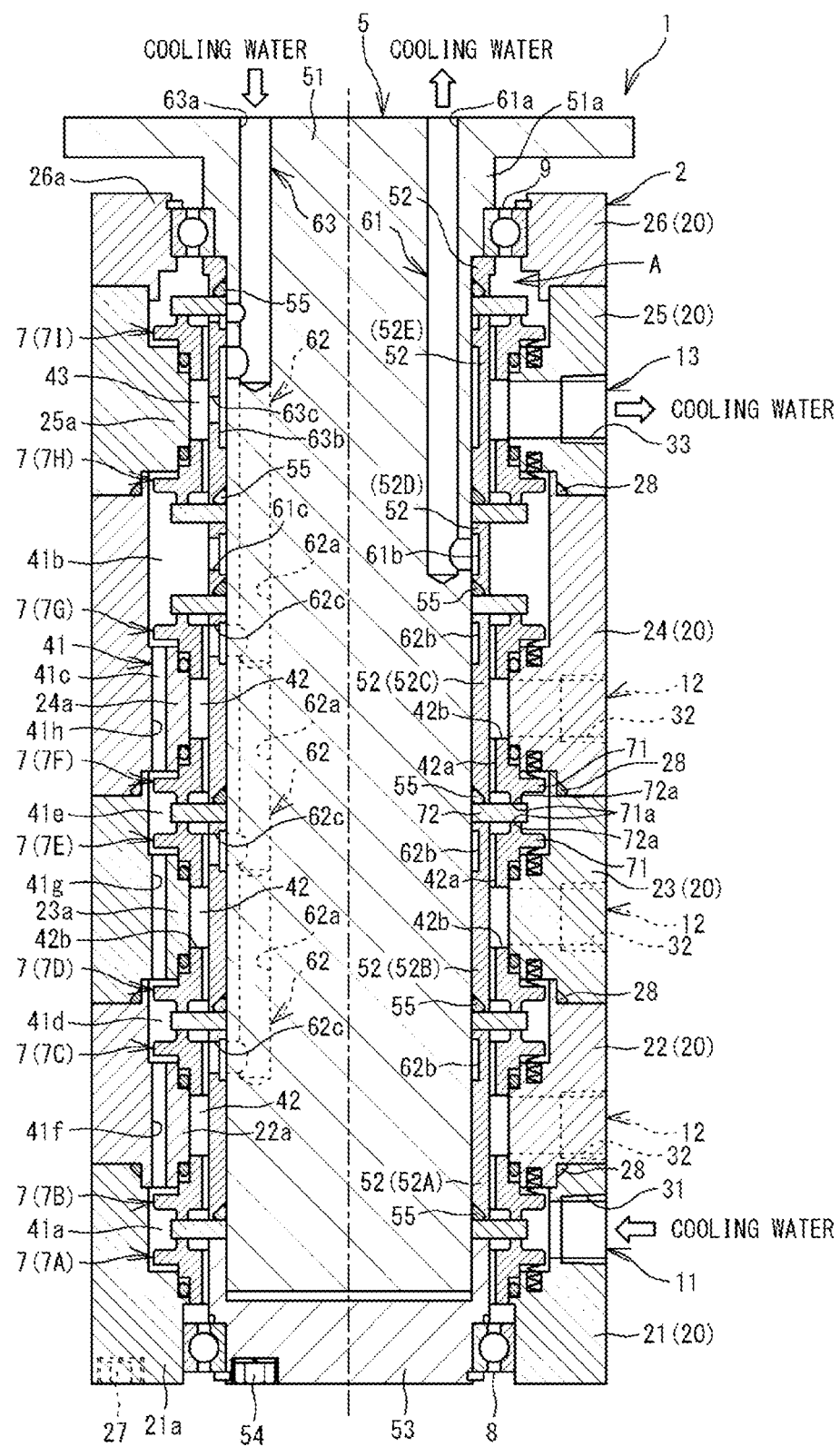
FIG. 1 is a cross-sectional view illustrating a rotary joint according to a first embodiment of the invention.

FIG. 1 is a cross-sectional view illustrating a rotary joint according to a first embodiment of the invention. A rotary joint 1 (hereinafter also referred to as a joint 1) includes a tubular case body 2 attached to a fixed side member (for example, a main body of a CMP device) of a rotating machine, and a shaft body 5 attached to a rotating side member (for example, a turntable of the CMP device) of the rotating machine. The case body 2 and the shaft body 5 of the present embodiment are disposed with an axial direction as a vertical direction.

Note that in the invention, the "axial direction" is a direction along a center line of the joint 1 (including a direction parallel to the center line), and respective center lines of the case body 2, the shaft body 5, and a mechanical seal 7 described below are configured to coincide with the center line of the joint 1. In addition, in the invention, a "radial direction" refers to a direction orthogonal to the center line of the joint 1. In addition, a posture of the joint 1 may correspond to a posture other than a posture illustrated in FIG. 1. For convenience of description, in the present embodiment, an upper side illustrated in FIG. 1 is set to "up" of the joint 1, and a lower side is set to "down" of the joint 1.

<Case Body>

The case body 2 is configured by stacking a plurality of flanges 20 in the vertical direction. In the present embodiment, the plurality of flanges 20 includes a first flange 21, a second flange 22, a third flange 23, a fourth flange 24, a fifth flange 25, and a sixth flange 26 in order from the bottom. Each of the flanges 21 to 26 is formed in an annular shape, and is connected and fixed by a bolt 27. In this way, the case body 2 corresponds to a tubular structure as a whole.

Hereinafter, when common matters of two or more flanges in the first to sixth flanges 21 to 26 are described, the flanges are collectively referred to as a flange 20.

In the first to fifth flanges 21 to 25, O-rings 28 are provided between adjacent flanges 20, respectively.

Each of the first to sixth flanges 21 to 26 has annular protrusions 21a, 22a, 23a, 24a, 25a, and 26a protruding inward in the radial direction.

A first outer flow passage 31 through which a sealed fluid flows is formed in the first flange 21 to penetrate the first flange 21 in the radial direction such that the sealed fluid passes through a portion other than the protrusion 21a. Examples of the sealed fluid include a liquid such as polishing liquid, washing water, pure water, cooling water, oil, coolant, or polishing residual liquid, and gas such as fluid pressurizing air or air blowing air. In the present embodiment, cooling water corresponding to a liquid flows through the first outer flow passage 31 as the sealed fluid.

A second outer flow passage 32 through which the sealed fluid flows is formed in each of the second to fourth flanges 22 to 24 to penetrate thereto in the radial direction such that the sealed fluid passes through the protrusions 22a, 23a and 24a. In the present embodiment, air corresponding to a gas flows through the second outer flow passage 32 as the sealed fluid.

A third outer flow passage 33 through which the sealed fluid flows is formed in the fifth flange 25 to penetrate thereto in the radial direction such that the sealed fluid passes through a portion other than the protrusion 25a. In the present embodiment, cooling water corresponding to a liquid flows through the third outer flow passage 33 as the sealed fluid. Note that similarly to the first flange 21, liquid such as polishing liquid, washing water, pure water, cooling water, oil, coolant, or polishing residual liquid can flow through the fifth flange 25.

Both end portions of each of the outer flow passages 31 to 33 is open on an inner circumferential side and an outer circumferential side of the flange 20. In the present embodiment, an opening of the flange 20 on the outer circumferential side serves as a connection port to which a plurality of respective pipes of the fixed side member is connected. As described above, the first outer flow passage 31 and the third outer flow passage 33 through which cooling water flows as the sealed fluid and a plurality of second outer flow passages 32 through which air flows as the sealed fluid are formed in the case body 2 at intervals along the axial direction.

<Shaft Body>

The shaft body 5 is disposed on the inner circumferential side of the case body 2, and includes a linear shaft main body 51 which is long in the vertical direction and a plurality of sleeves 52 fit to the shaft main body 51. In addition to the sleeves 52, second seal rings 72 of a plurality of mechanical seals 7 are fit to the shaft main body 51, and the sleeves 52 and the second seal rings 72 are alternately disposed along the axial direction. In the present embodiment, six sleeves 52 and six second seal rings 72 are provided.

A pressing member 53 is fixed below the shaft main body 51 by a bolt 54. In addition, a large diameter portion 51a having a large diameter is formed at an upper end portion of the shaft main body 51. The large diameter portion 51a regulates upward movement of the sleeves 52 and the second seal rings 72 fit to the shaft main body 51.

O-rings 55 are provided between the shaft main body 51 and the sleeves 52 and the second seal rings 72. The O-rings 55 prevent the sealed fluid flowing through each of inner flow passages 61 and 63 described below from entering another flow passage or leaking to the outside.

A rolling bearing 8 is provided between the pressing member 53 and the protrusion 21a of the first flange 21, and a rolling bearing 9 is provided between the large diameter portion 51a of the shaft main body 51 and the protrusion 26a of the sixth flange 26. In this way, the shaft body 5 including the shaft main body 51 and the sleeves 52 is rotatably supported on the case body 2 together with the second seal ring 72.

In the shaft main body 51, one flow passage hole 61a and one flow passage hole 63a are formed, and a plurality of (three in the illustrated example) flow passage holes 62a is formed. One side of each of the flow passage holes 61a to 63a is open at a different position in the axial direction (vertical direction) on the outer circumferential surface of the shaft main body 51. The other side of each of the flow passage holes 61a to 63a is open on an end surface (upper end surface) of the shaft main body 51, and a plurality of pipes of the rotating side member is connected to openings on the end surface, respectively.

The sleeves 52 and 52 corresponding to the openings on the one side of the respective flow passage holes 61a and 63a have annular gaps 61b and 63b formed between the sleeves 52 and 52 and the outer circumferential surface of the shaft main body 51 on the inner circumferential side, and through-holes 61c and 63c communicating with the respective gaps 61b and 63b.

Similarly, the sleeve 52 corresponding to the opening on the one side of each of the flow passage holes 62a has an annular gap 62b formed between the sleeve 52 and the outer circumferential surface of the shaft main body 51 on the inner side in the radial direction, and a through-hole 62c communicating with the gap 62b.

The respective gaps 61b to 63b communicate with the corresponding flow passage holes 61a to 63a. A plurality of through-holes 61c (only one through-hole is illustrated in the figure), a plurality of through-holes 62c (only one through-hole is illustrated in the figure), and a plurality of through-holes 63c (only one through-hole is illustrated in the figure) are formed at intervals in a circumferential direction, respectively.

The flow passage hole 61a in the shaft main body 51, the gap 61b of the corresponding sleeve 52, and the plurality of through-holes 61c are included in a first inner flow passage 61 through which cooling water corresponding to a liquid flows as the sealed fluid. In this way, the first inner flow passage 61 has the through-holes 61c used as opening holes of the shaft body 5 on the outer circumferential side.

The respective flow passage holes 62a in the shaft main body 51, the gap 62b of the corresponding sleeve 52, and the plurality of through-holes 62c are included in a second inner flow passage 62 through which air corresponding to a gas flows as the sealed fluid. In this way, each second inner flow passage 62 has the through-holes 62c used as opening holes of the shaft body 5 on the outer circumferential side.

The flow passage hole 63a in the shaft main body 51, the gap 63b of the corresponding sleeve 52, and the plurality of through-holes 63c are included in a third inner flow passage 63 through which cooling water corresponding to a liquid flows as the sealed fluid. In this way, the third inner flow passage 63 has the through-holes 63c used as opening holes of the shaft body 5 on the outer circumferential side.

As described above, the respective inner flow passages 61 to 63 have the through-holes 61c to 63c used as the opening holes of the shaft body 5 on the outer circumferential side. Therefore, one first inner flow passage 61, the same number (three) of second inner flow passages 62 as the second outer flow passages 32, and one third inner flow passage 63 are formed in the shaft body 5 to open at different positions in the axial direction.

In the present embodiment, the third inner flow passage 63 is open at a position on the upper side of the opening of the first inner flow passage 61 and the openings of the second inner flow passages 62 in the axial direction. Note that in the shaft body 5, the third inner flow passage 63 is not limited to the case of opening at the illustrated position, and may be opened at any position in the axial direction.

<Overall Configuration of Plurality of Mechanical Seals>

An annular space A is formed between the case body 2 and the shaft body 5, and a plurality of (nine in the illustrated example) mechanical seals 7 is provided in the annular space A. The joint 1 of the present embodiment is a multi-flow passage rotary joint obtained by disposing the plurality of mechanical seals 7 in the axial direction of the annular space A.

The plurality of mechanical seals 7 includes a mechanical seal 7 for forming a first intermediate flow passage 41 connecting the first outer flow passage 31 and the first inner flow passage 61 to each other, a mechanical seal 7 for forming a second intermediate flow passage 42 connecting the second outer flow passage 32 and the second inner flow passages 62 to each other one by one, and a mechanical seal 7 for forming a third intermediate flow passage 43 connecting the third outer flow passage 33 and the third inner flow passage 63 to each other.

<Mechanical Seal Forming Third Intermediate Flow Passage>

Figure 2:
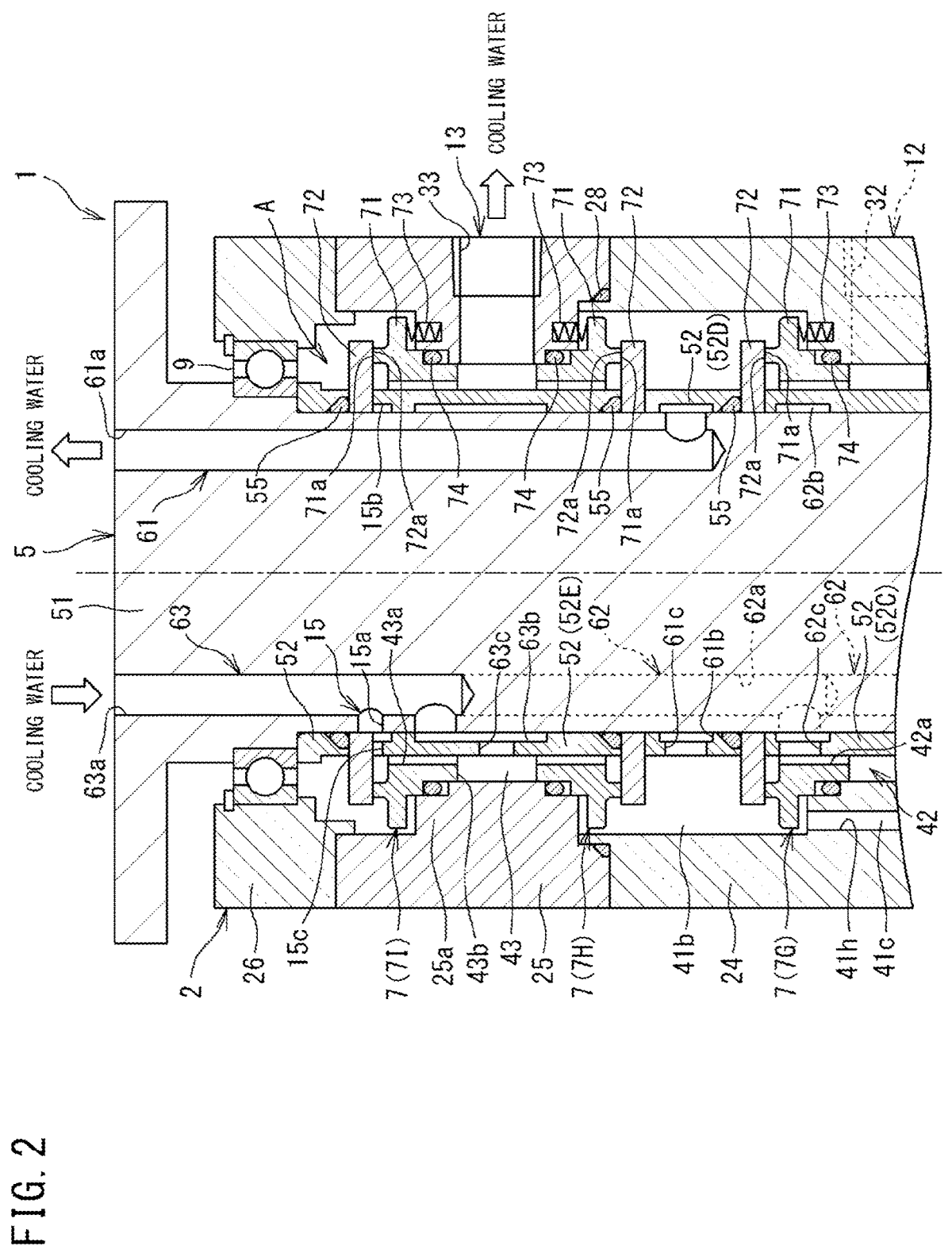

FIG. 2 is an enlarged cross-sectional view illustrating an upper side of the joint 1. In FIG. 2, one sleeve 52E is disposed on the inner circumferential side of the fifth flange 25 to face the fifth flange 25, and the third inner flow passage 63 (through-holes 63c) which is open in the sleeve 52E and the third outer flow passage 33 which is open on the inner circumferential side of the fifth flange 25 are open at the same positions in the axial direction. Further, two mechanical seals 7H and 7I forming the third intermediate flow passage 43 are provided between the sleeve 52E and the fifth flange 25.

Each of the mechanical seals 7H and 7I includes a first seal ring (static seal ring) 71 attached to the case body 2 side, a second seal ring (rotary seal ring) 72 attached to the shaft body 5 side, and a coil spring 73 as a pressing member.

The second seal ring 72 includes an annular member, and is provided so as to be integrally rotatable with the shaft body 5 as described above. An axial end surface of the second seal ring 72 is in contact with an axial end surface of the sleeve 52E, and the sleeve 52E serves as a spacer between the second seal rings 72 and 72 of the mechanical seals 7H and 7I adjacent in the axial direction. An annular second sealing surface 72a is formed at one axial end of the second seal ring 72.

The first seal ring 71 includes an annular member, and is disposed on the outside of the sleeve 52E in the radial direction. In this state, the first seal ring 71 is prevented from rotating around the case body 2. The second sealing surface 72a in contact with the first sealing surface 71a is formed on the end surface of the first seal ring 71 on the second seal ring 72 side.

The coil spring 73 is interposed between the protrusion 25a of the fifth flange 25 and the first seal ring 71 in a compressed state. A plurality (only one coil spring is illustrated in the figure) of coil springs 73 is provided along the circumferential direction. For this reason, due to an elastic restoring force of the plurality of coil springs 73, the first seal ring 71 is pressed toward the second seal ring 72 side in the axial direction, and a pressing force in the axial direction acts between both the sealing surfaces 71a and 72a. In this way, the two sealing surfaces 71a and 72a can be brought into contact with each other while being pressed in the axial direction. Note that a pressing member other than the coil spring 73 may be used.

Therefore, when the first sealing surface 71a of the first seal ring 71 comes into sliding contact with the second sealing surface 72a of the second seal ring 72, a sealing function is exhibited such that the sealed fluid is prevented from leaking from between the two sealing surfaces 71a and 72a. That is, a sealing function of the mechanical seals 7H and 7I is exhibited by a sliding contact action in association with relative rotation of the first sealing surface 71a of the first seal ring 71 and the second sealing surface 72a of the second seal ring 72.

The first seal ring 71 of each of the mechanical seals 7H and 7I is provided to have a gap between the first seal ring 71 and an outer circumferential surface of the sleeve 52E, and an annular gap flow passage 43a is formed between the first seal ring 71 and the sleeve 52. The gap flow passage 43a communicates with the through-hole 63c of the sleeve 52E. Further, the sealed fluid is prevented from leaking to the outside from the gap flow passage 43a by a sealing function of the first and second sealing surfaces 71a and 72a of the mechanical seal 7H and a sealing function of the first and second sealing surfaces 71a and 72a of the mechanical seal 7I.

Further, an annular flow passage 43b is formed between the first seal rings 71 and 71 of the mechanical seals 7H and 7I, and the annular flow passage 43b connects the gap flow passage 43a and the third outer flow passage 33 to each other. Further, an O-ring 74 is provided between the outer circumferential surface of each first seal ring 71 and the inner circumferential surface of the protrusion 25a of the fifth flange 25. The O-ring 74 prevents the sealed fluid from leaking to the outside from the annular flow passage 43b. Note that each first seal ring 71 is fit to the protrusion 25a of the fifth flange 25 through the O-ring 74 in an axially movable state.

As described above, the sealed gap flow passage 43a and the annular flow passage 43b are interposed between the third outer flow passage 33 and the third inner flow passage 63, and these flow passages 43a and 43b are included in the third intermediate flow passage 43 connecting the third outer flow passage 33 and the third inner flow passage 63 to each other. In this way, the third outer flow passage 33 and the third inner flow passage 63 are connected by the third intermediate flow passage 43 formed using the mechanical seals 7H and 7I that are adjacent in the axial direction.

Further, one independent third fluid passage 13 includes the third outer flow passage 33, the third intermediate flow passage 43, and the third inner flow passage 63.

<Mechanical Seals Forming Plurality of Second Intermediate Flow Passage>

Figure 3:
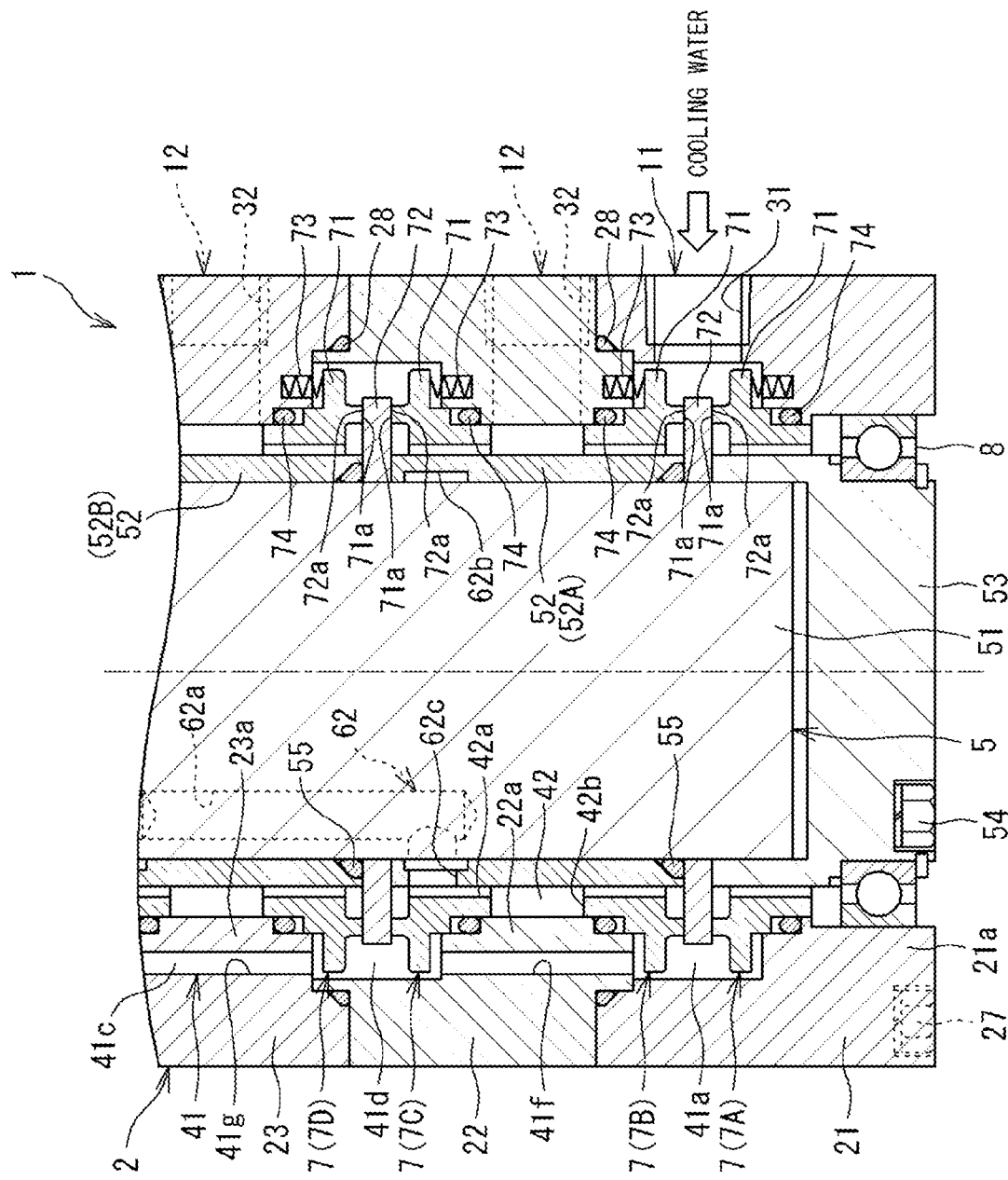
FIG. 3 is an enlarged cross-sectional view illustrating a lower side of the rotary joint.
Figure 5:
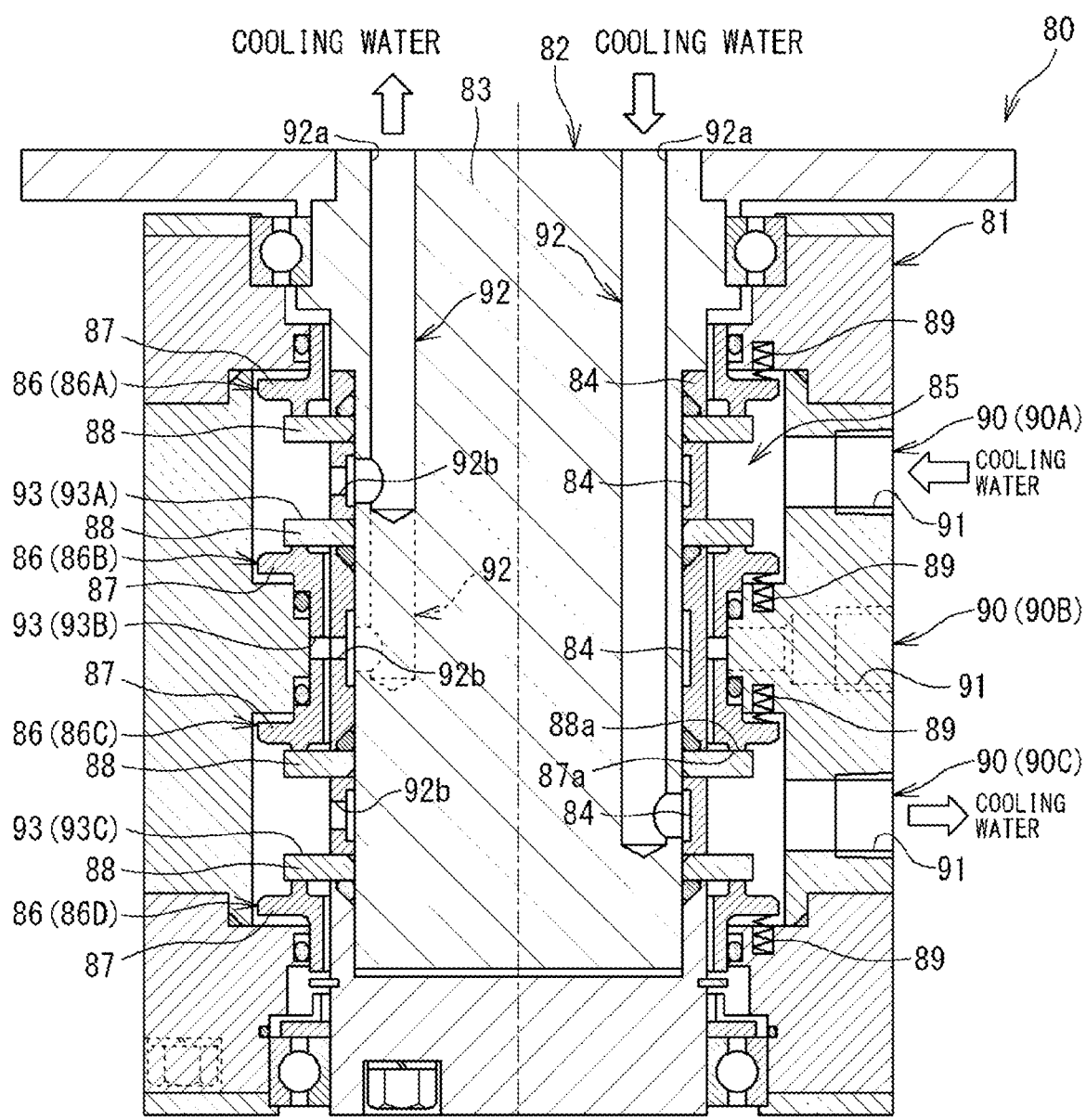
FIG. 5 is a cross-sectional view illustrating a conventional rotary joint.

FIG. 3 is an enlarged cross-sectional view illustrating a lower side of the joint 1. In FIG. 3, one sleeve 52A is disposed on the inner circumferential side of the second flange 22 to face the second flange 22, and the second inner flow passage 62 (through-hole 62c) which is open at the sleeve 52A opens at a position slightly above the second outer flow passage 32 which is open on the inner circumferential side of the second flange 22 in the axial direction. Further, two mechanical seals 7B and 7C forming the second intermediate flow passage 42 that connects the second outer flow passage 32 and the second inner flow passage 62 to each other are provided between the sleeve 52 and the second flange 22. The respective mechanical seals 7B and 7C have the same configuration as that of the mechanical seals 7H and 7I, and thus a detailed description thereof will be omitted.

The first seal ring 71 of each of the mechanical seals 7B and 7C is provided to have a gap between the first seal ring 71 and the outer circumferential surface of the sleeve 52A, and an annular gap flow passage 42a is formed between the first seal ring 71 and the sleeve 52A. The gap flow passage 42a communicates with the through-hole 62c of the sleeve 52A. Further, the sealed fluid is prevented from leaking to the outside from the gap flow passage 42a by a sealing function of the first and second sealing surfaces 71a and 72a of the mechanical seal 7B and a sealing function of the first and second sealing surfaces 71a and 72a of the mechanical seal 7C.

Further, an annular flow passage 42b is formed between the first seal rings 71 and 71 of the mechanical seals 7B and 7C, and the annular flow passage 42b connects the gap flow passage 42a and the second outer flow passage 32 to each other. Further, an O-ring 74 is provided between the outer circumferential surface of each first seal ring 71 and the inner circumferential surface of the protrusion 22a of the second flange 22. The O-ring 74 prevents the sealed fluid from leaking to the outside from the annular flow passage 42b. Note that each first seal ring 71 is fit to the protrusion 22a of the second flange 22 through the O-ring 74 in an axially movable state.

As described above, the sealed gap flow passage 42a and the annular flow passage 42b are interposed between the second outer flow passage 32 and the second inner flow passage 62, and the flow passages 42a and 42b are included in the first second intermediate flow passage 42 connecting the first second outer flow passage 32 and the first second inner flow passage 62 to each other. As described above, the first second outer flow passage 32 and the first second inner flow passage 62 are connected by the second intermediate flow passage 42 formed using the mechanical seals 7 adjacent in the axial direction. Further, one independent second fluid passage 12 includes the second outer flow passage 32, the second intermediate flow passage 42, and the second inner flow passage 62.

In FIG. 1, similarly to the above description, two mechanical seals 7D and 7E forming the second second intermediate flow passage 42 connecting the second second outer flow passage 32 and the second second inner flow passage 62 to each other are provided between the third flange 23 and the sleeve 52B facing the inner circumferential side thereof.

The sealed gap flow passage 42a and the annular flow passage 42b are interposed between the second outer flow passage 32 which is open on the inner circumferential side of the third flange 23 and the second inner flow passage 62 (through-hole 62c) which is open on the inner circumferential side of the sleeve 52B, and the flow passages 42a and 42b are included in the second second intermediate flow passage 42. Further, the second independent second fluid passage 12 includes the second outer flow passage 32, the second intermediate flow passage 42, and the second inner flow passage 62.

Furthermore, two mechanical seals 7F and 7G forming the third second intermediate flow passage 42 connecting the third second outer flow passage 32 and the third second inner flow passage 62 to each other are provided between the fourth flange 24 and the sleeve 52C facing the inner circumferential side thereof.

The sealed gap flow passage 42a and the annular flow passage 42b are interposed between the second outer flow passage 32 which is open on the inner circumferential side of the fourth flange 24 and the second inner flow passage 62 (through-hole 62c) which is open on the inner circumferential side of the sleeve 52C, and the flow passages 42a and 42b are included in the third second intermediate flow passage 42. Further, the third independent second fluid passage 12 includes the second outer flow passage 32, the second intermediate flow passage 42, and the second inner flow passage 62.

As described above, the mechanical seals 7B to 7G form the plurality of second intermediate flow passages 42 connecting the plurality of second outer flow passages 32 and the plurality of second inner flow passages 62 one by one to configure the plurality of independent second fluid passages 12.

Note that in the present embodiment, the second seal ring 72 of the mechanical seal 7C also serves as the second seal ring 72 of the mechanical seal 7D adjacent above the mechanical seal 7C. However, the second seal ring 72 may be provided for each of the mechanical seals 7C and 7D. Similarly, the second seal ring 72 of the mechanical seal 7E also serves as the second seal ring 72 of the mechanical seal 7F adjacent above the mechanical seal 7E. However, the second seal ring 72 may be provided for each of the mechanical seals 7E and 7F.

<Mechanical Seal for Forming First Intermediate Flow Passage>

As illustrated in FIG. 1, the first outer flow passage 31 and the first inner flow passage 61 are open at different positions in the axial direction (vertical direction) with the second intermediate flow passages 42 of the plurality of second fluid passages 12 interposed therebetween on the outer circumferential side of the shaft body 5. In the present embodiment, the opening of the first outer flow passage 31 is located on the lower side of the opening the first inner flow passage 61 in the axial direction. That is, the first outer flow passage 31 is open at a location on the lower side of the plurality of second intermediate flow passages 42 in the axial direction, and the first inner flow passage 61 is open on the upper side of the plurality of second intermediate flow passages 42 in the axial direction. Further, these openings are connected by the first intermediate flow passage 41. Therefore, one independent first fluid passage 11 includes the first outer flow passage 31, the first intermediate flow passage 41, and the first inner flow passage 61.

In the present embodiment, the first intermediate flow passage 41 of the first fluid passage 11 includes a first annular flow passage 41a formed in the annular space A to communicate with the opening of the first outer flow passage 31, a second annular flow passage 41b formed in the annular space A to communicate with the opening of the first inner flow passage 61, and a connecting flow passage 41c that connects the first annular flow passage 41a and the second annular flow passage 41b to each other.

In the annular space A, the two mechanical seals 7A and 7B forming the first annular flow passage 41a are provided, and the two mechanical seals 7G and 7H forming the second annular flow passage 41b are provided.

Note that the mechanical seal 7B is a mechanical seal forming the second intermediate flow passage 42 as described above, and also serves as a mechanical seal forming the first annular flow passage 41a. Similarly, the mechanical seals 7G and 7H are mechanical seals forming the second intermediate flow passage 42 and the third intermediate flow passage 43, respectively, as described above, and also serve as a mechanical seal forming the second annular flow passage 41b. A configuration of the mechanical seal 7A is similar to a configuration of another mechanical seal 7. Therefore, a detailed description of the mechanical seals 7A, 7B, 7G, and 7H will be omitted.

In FIG. 3, the first annular flow passage 41a is formed between the mechanical seals 7A and 7B and the first flange 21 facing the mechanical seals 7A and 7B, and the mechanical seals 7A and 7B communicating with the first outer flow passage 31 which is open on the inner circumferential side of the first flange 21 has a common second seal ring 72.

By a sealing function of the first and second sealing surfaces 71a and 72a of the mechanical seal 7A and the O-ring 74 provided on the outer circumferential side of the first seal ring 71 of the mechanical seal 7A, the sealed fluid is prevented from leaking to the outside from the lower side of the first annular flow passage 41a in the axial direction.

In addition, by a sealing function of the first and second sealing surfaces 71a and 72a of the mechanical seal 7B and the O-ring 74 provided on the outer circumferential side of the first seal ring 71 of the mechanical seal 7B, the sealed fluid is prevented from leaking from the upper side of the first annular flow passage 41a in the axial direction to the second intermediate flow passage 42 (gap flow passage 42a) formed on the inner circumferential side thereof.

In FIG. 2, the second annular flow passage 41b is provided between the mechanical seals 7G and 7H and a sleeve 52D disposed therebetween, and the fourth flange 24 facing the sleeve 52D. In this way, the second annular flow passage 41b communicates with the first inner flow passage 61 (through-hole 61c) which is open on the outer circumferential side of the shaft body 5.

By a sealing function of the first and second sealing surfaces 71a and 72a of the mechanical seal 7G and the O-ring 74 provided on the outer circumferential side of the first seal ring 71 of the mechanical seal 7G, the sealed fluid is prevented from leaking from the lower side of the second annular flow passage 41b in the axial direction to the second intermediate flow passage 42 (gap flow passage 42a) formed on the inner circumferential side thereof.

Similarly, by a sealing function of the first and second sealing surfaces 71a and 72a of the mechanical seal 7H and the O-ring 74 provided on the outer circumferential side of the first seal ring 71 of the mechanical seal 7H, the sealed fluid is prevented from leaking from the upper side of the second annular flow passage 41b in the axial direction to the third intermediate flow passage 43 (gap flow passage 43a) formed on the inner circumferential side thereof.

In FIG. 1, the connecting flow passage 41c connecting the first annular flow passage 41a and the second annular flow passage 41b to each other has a plurality of (two in the illustrated example) third annular flow passages 41d and 41e formed in the axial direction in the annular space A, and a plurality of (three in the illustrated example) flow passage holes 41f, 41g, and 41h formed in the case body 2.

The third annular flow passage 41d is formed between the mechanical seals 7C and 7D forming the second inner flow passages 62 adjacent in the axial direction, respectively, and the second and third flanges 22 and 23 facing the mechanical seals 7C and 7D. By a sealing function of the first and second sealing surfaces 71a and 72a of the mechanical seal 7C and a sealing function of the first and second sealing surfaces 71a and 72a of the mechanical seal 7D, the sealed fluid is prevented from leaking from the third annular flow passage 41d to two upper and lower second intermediate flow passages 42 (gap flow passages 42a) formed on the inner circumferential side thereof (see FIG. 3).

The third annular flow passage 41e is formed between the mechanical seals 7E and 7F forming the second inner flow passages 62 adjacent in the axial direction, respectively, and the third and fourth flanges 23 and 24 facing the mechanical seals 7E and 7F. By a sealing function of the first and second sealing surfaces 71a and 72a of the mechanical seal 7E and a sealing function of the first and second sealing surfaces 71a and 72a of the mechanical seal 7F, the sealed fluid is prevented from leaking from the third annular flow passage 41e to two upper and lower second intermediate flow passages 42 (gap flow passages 42a) formed on the inner circumferential side thereof.

The flow passage hole 41f on the case body 2 side is formed in the protrusion 22a of the second flange 22 to penetrate thereto in the axial direction, and connects an upper end portion of the first annular flow passage 41a and a lower end portion of the third annular flow passage 41d to each other. The flow passage hole 41g is formed in the protrusion 23a of the third flange 23 to penetrate thereto in the axial direction, and connects an upper end portion of the third annular flow passage 41d and a lower end portion of the third annular flow passage 41e to each other. The flow passage hole 41h is formed in the protrusion 24a of the fourth flange 24 to penetrate thereto in the axial direction, and connects an upper end portion of the third annular flow passage 41e and a lower end portion of the second annular flow passage 41b to each other.

As described above, the plurality of flow passage holes 41f to 41h connects the first annular flow passage 41a and the second annular flow passage 41b via the plurality of third annular flow passages 41d and 41e. That is, the first outer flow passage 31 and the first inner flow passage 61 are connected via the first annular flow passage 41a, the flow passage hole 41f, the third annular flow passage 41d, the flow passage hole 41g, the third annular flow passage 41e, the flow passage hole 41h, and the second annular flow passage 41b in order from the bottom.

In this way, the cooling water (sealed fluid) flowing through the first intermediate flow passage 41 lubricates and cools the first and second sealing surfaces 71a and 72a of each of the mechanical seals 7B to 7G forming the plurality of second intermediate flow passages 42.

Specifically, the cooling water flowing through the first annular flow passage 41a lubricates and cools the first and second sealing surfaces 71a and 72a of the mechanical seal 7B forming the second intermediate flow passage 42. The cooling water flowing through the third annular flow passage 41d lubricates and cools the first and second sealing surfaces 71a and 72a of the mechanical seals 7C and 7D.

The cooling water flowing through the third annular flow passage 41e lubricates and cools the first and second sealing surfaces 71a and 72a of the mechanical seals 7F and 7E. The cooling water flowing through the second annular flow passage 41b lubricates and cools the first and second sealing surfaces 71a and 72a of the mechanical seal 7G forming the second intermediate flow passage 42.

Note that the cooling water flowing through the first annular flow passage 41a lubricates and cools the first and second sealing surfaces 71a and 72a of the mechanical seal 7A. In addition, the cooling water flowing through the second annular flow passage 41b lubricates and cools the first and second sealing surfaces 71a and 72a of the mechanical seal 7H.

<Flow of Cooling Water of First and Second Fluid Passages>

In FIG. 1, the first outer flow passage 31 is a supply flow passage that supplies cooling water from a supply source of the cooling water (sealed fluid) into the case body 2. In this way, an opening of the case body 2 on the outer circumferential side in the first outer flow passage 31 serves as a supply portion through which the cooling water is supplied from the supply source.

The first inner flow passage 61 serves as a delivery flow passage (discharge flow passage) that sends (discharges) cooling water to the rotating side member from the inside of the shaft body 5. In this way, an opening of the shaft main body 51 on the upper end side in the first inner flow passage 61 serves as a delivery port (discharge port) that sends cooling water to the rotating side member.

Therefore, the first fluid passage 11 sends the cooling water, which is supplied from the supply source of the cooling water to the first outer flow passage 31, from the first inner flow passage 61 to the rotating side member via the first intermediate flow passage 41.

The third inner flow passage 63 serves as a collection flow passage (supply flow passage) that collects (supplies) cooling water from the rotating side member into the shaft body 5. In this way, an opening of the shaft main body 51 on the upper end side in the third inner flow passage 63 serves as a collection port (supply port) through which cooling water is collected from the rotating side member.

The third outer flow passage 33 serves as a discharge flow passage that discharges cooling water from the inside of the case body 2 to the outside. In this way, an opening of the case body 2 on the outer circumferential side in the third outer flow passage 33 serves as a discharge port that discharges cooling water to the outside of the case body 2.

Therefore, the third fluid passage 13 discharges the cooling water, which is collected in the third inner flow passage 63 from the rotating side member, from the third outer flow passage 33 to the outside via the third intermediate flow passage 43.

In FIG. 2, a branch flow passage 15 branching from an intermediate portion of the third inner flow passage 63 and communicating with the upper end portion of the third intermediate flow passage 43 in the axial direction is formed in the shaft body 5. The branch flow passage 15 has a flow passage hole 15a formed in the shaft main body 51 and an annular gap 15b and a through groove 15c formed in the sleeve 52E facing the gap flow passage 43a of the third intermediate flow passage 43.

The flow passage hole 15a branches to extend radially outward from an intermediate portion of a part of the third inner flow passage 63 extending in the vertical direction (axial direction) and opens at a position slightly above an opening of the third inner flow passage 63 on the outer circumferential side of the shaft main body 51.

The annular gap 15b is formed between the inner circumferential side of the sleeve 52E and the outer circumferential surface of the shaft main body 51, and communicates with an opening of the flow passage hole 15a.

The through groove 15c is formed in an upper end portion of the sleeve 52E in the axial direction, and connects an upper end portion of the gap flow passage 43a in the axial direction (annular space formed between a contact portion of the first and second sealing surfaces 71a and 72a and the outer circumferential surface of the sleeve 52E) and the gap 15b to each other.

As described above, a part of the cooling water flowing through the third inner flow passage 63 passes through the upper end portion of the gap flow passage 43a in the axial direction via the flow passage hole 15a, the gap 15b, and the through groove 15c of the branch flow passage 15, and is guided to the third outer flow passage 33 via the annular flow passage 43b. In this way, it is possible to suppress generation of an air pocket near a part between the first and second sealing surfaces 71a and 72a of the mechanical seal 7I disposed at the upper end portion of the gap flow passage 43a in the axial direction, that is, a top of the annular space A.

<Effect>

As described above, according to the rotary joint 1 of the present embodiment, in the first fluid passage 11 through which the liquid (cooling water) flows, the opening of the first outer flow passage 31 on the case body 2 side and the opening of the first inner flow passage 61 on the shaft body 5 side are open at different positions in the axial direction with the second intermediate flow passages 42 of the plurality of second fluid passages 12 through which gas (air) flows interposed therebetween. Further, the first intermediate flow passage 41 connecting the opening of the first outer flow passage 31 and the opening of the first inner flow passage 61 to each other is formed such that the liquid flowing through the first intermediate flow passage 41 lubricates the first and second sealing surfaces 71a and 72a of the mechanical seals 7B to 7G forming the plurality of second intermediate flow passages 42. In this way, it is possible to lubricate the first and second sealing surfaces 71a and 72a of the mechanical seals 7B to 7G forming the plurality of second fluid passages 12 (second intermediate flow passages 42) through which a gas flows using the liquid flowing through the one first fluid passage 11 (first intermediate flow passage 41).

In addition, the first intermediate flow passage 41 of the first fluid passage 11 includes the first annular flow passage 41a communicating with the opening of the first outer flow passage 31, the second annular flow passage 41b communicating with the opening of the first inner flow passage 61, and the connecting flow passage 41c that connects the first annular flow passage 41a and the second annular flow passage 41b to each other. For this reason, the first intermediate flow passage 41 can be formed by a simple configuration in which the first annular flow passage 41a and the second annular flow passage 41b are connected by the connecting flow passage 41c.

In addition, the connecting flow passage 41c of the first intermediate flow passage 41 includes the plurality of third annular flow passages 41d and 41e formed using the mechanical seals 7C to 7F that form the respective second inner flow passages 62, and the plurality of flow passage holes 41f to 41h connecting the first annular flow passage 41a and the second annular flow passage 41b via the plurality of third annular flow passages 41d and 41e. In this way, since the liquid flowing through the connecting flow passage 41c passes through each of the plurality of third annular flow passages 41d and 41e formed using the mechanical seals 7C to 7F that form the respective second inner flow passages 62, it is possible to reliably lubricate the first and second sealing surfaces 71a and 72a of the mechanical seals 7C to 7F disposed in the middle of the connecting flow passage 41c.

In addition, the liquid flowing through the first fluid passage 11 is supplied from the first outer flow passage 31 located on the lower side in the axial direction and discharged to the outside from the first inner flow passage 61 located on the upper side in the axial direction. In this instance, the liquid flowing into the first intermediate flow passage 41 from the opening of the first outer flow passage 31 is guided to the opening of the first inner flow passage 61 by successively passing through the vicinity between the first and second sealing surfaces 71a and 72a of each of the mechanical seals 7B to 7G forming the plurality of second intermediate flow passages 42, respectively. In this way, generation of an air pocket near a part between the first and second sealing surfaces 71a and 72a of each of the mechanical seals 7B to 7G can be inhibited, and thus it is possible to suppress insufficient lubrication between the first and second sealing surfaces 71a and 72a.

In addition, the opening of the third inner flow passage 63 of the third fluid passage 13 is located on the upper side of the opening of the first inner flow passage 61 of the first fluid passage 11 in the axial direction. For this reason, for example, when the third inner flow passage 63 is dug from an upper end in the axial direction to a lower end in the axial direction of the shaft main body 51, the third inner flow passage 63 may not be deeply dug to a lower side of an opening position of the first inner flow passage 61, and thus the third inner flow passage 63 can be easily processed.

In addition, the branch flow passage 15 branching from the intermediate portion of the third inner flow passage 63 and communicating with the upper end portion of the third intermediate flow passage 43 in the axial direction is formed in the shaft body 5. For this reason, the liquid flowing through the third inner flow passage 63 is supplied to the upper end portion of the third intermediate flow passage 43 in the axial direction via the branch flow passage 15 from the intermediate portion of the third inner flow passage 63, and guided to the third outer flow passage 33 by passing through the vicinity of a part between the first and second sealing surfaces 71a and 72a of the mechanical seal 7I forming the upper end portion in the axial direction. In this way, it is possible to suppress generation of an air pocket in the vicinity of the part between the first and second sealing surfaces 71a and 72a of the mechanical seal 7I disposed at the top of the annular space A, and thus it is possible to suppress insufficient lubrication between the first and second sealing surfaces 71a and 72a.

Second Embodiment

Figure 4:
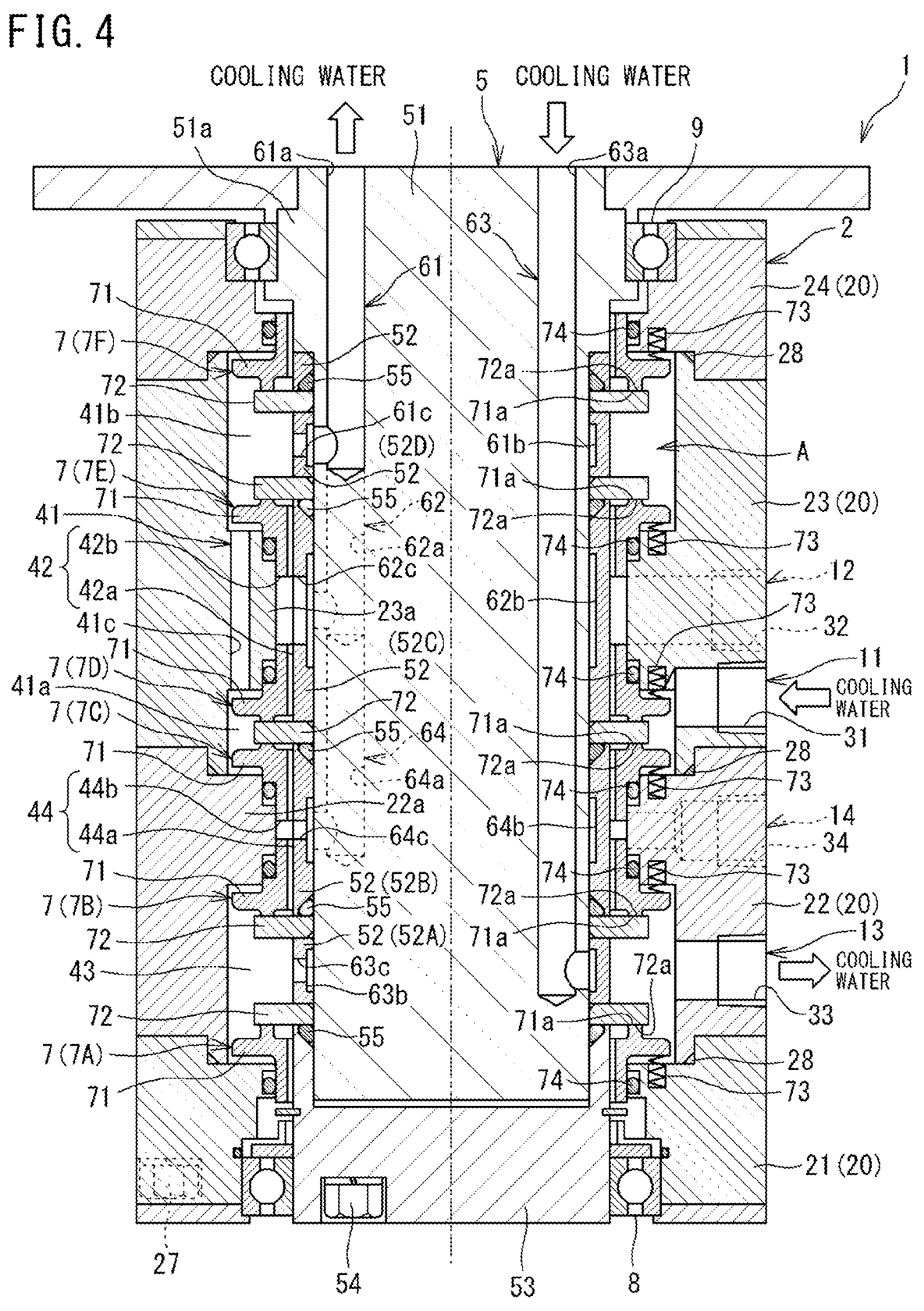

FIG. 4 is a cross-sectional view illustrating a rotary joint according to a second embodiment of the invention. A rotary joint 1 of the present embodiment is mainly different from the rotary joint 1 of the first embodiment in a positional relationship between the first outer flow passage 31 and the third outer flow passage 33 in the axial direction, in the number of second intermediate flow passages 42 formed between the opening of the first outer flow passage 31 and the opening of the first inner flow passage 61, and in that a fourth fluid passage 14 through which a gas flows is formed.

In FIG. 4, in the rotary joint 1 of the present embodiment, a plurality of flanges 20 of a case body 2 includes a first flange 21, a second flange 22, a third flange 23, and a fourth flange 24 in order from the bottom. A rolling bearing 8 is provided between the first flange 21 and a pressing member 53, and a rolling bearing 9 is provided between the fourth flange 24 and a large diameter portion 51a of a shaft main body 51. In this way, the shaft body 5 is rotatably supported with respect to the case body 2.

A first outer flow passage 31 through which cooling water corresponding to a liquid flows as a sealed fluid is formed below the third flange 23 in the axial direction to penetrate thereto in the radial direction. In addition, one second outer flow passage 32 through which air corresponding to a gas flows as a sealed fluid is formed above the first outer flow passage 31 of the third flange 23 in the axial direction to penetrate thereto in the radial direction.

A third outer flow passage 33 through which cooling water corresponding to a liquid flows as a sealed fluid is formed below the second flange 22 in the axial direction to penetrate thereto in the radial direction. In addition, one fourth outer flow passage 34 through which air corresponding to a gas flows as a sealed fluid is formed above the second flange 22 in the axial direction to penetrate thereto in the radial direction.

As described above, in the case body 2, one first outer flow passage 31 and one third outer flow passage 33 through which cooling water flows as a sealed fluid, and one second outer flow passage 32 and one fourth outer flow passage 34 through which air flows as a sealed fluid are formed along the axial direction.

One flow passage hole 61a, one flow passage hole 62a, one flow passage hole 63a, and one flow passage hole 64a are formed in the shaft main body 51. One side of each of the flow passage holes 61a to 64a is open at a different position in the axial direction (vertical direction) on an outer circumferential surface of the shaft main body 51. The other side of each of the flow passage holes 61a to 64a is open on an end surface (upper end surface) of the shaft main body 51, and each of a plurality of pipes of the rotating side member is connected to the opening on the end surface.

Sleeves 52 corresponding to the openings of the respective flow passage holes 61a to 64a on the one side have annular gaps 61b, 62b, 63b, and 64b formed between the sleeves 52 and the outer circumferential surface of the shaft main body 51 on the inner circumferential side and throughholes 61c, 62c, 63c, and 64c formed to penetrate thereto in the radial direction.

The respective gaps 61b to 64b communicate with the flow passage holes 61a to 64a of the corresponding sleeves 52. A plurality of through-holes 61c (only one through-hole is illustrated in the figure), a plurality of through-holes 62c (only one through-hole is illustrated in the figure), a plurality of through-holes 63c (only one through-hole is illustrated in the figure), and a plurality of through-holes 64c (only one through-hole is illustrated in the figure) are formed at intervals in the circumferential direction, respectively.

The flow passage hole 61a in the shaft main body 51, the gap 61b of the corresponding sleeve 52, and the plurality of through-holes 61c are included in a first inner flow passage 61 through which cooling water corresponding to a liquid flows as the sealed fluid. In this way, the first inner flow passage 61 has the through-holes 61c used as opening holes of the shaft body 5 on the outer circumferential side.

The flow passage holes 62*a* in the shaft main body 51, the gap 62*b* of the corresponding sleeve 52, and the plurality of through-holes 62*c* are included in a second inner flow passage 62 through which air corresponding to a gas flows as the sealed fluid. In this way, the second inner flow passage 62 has the through-holes 62*c* used as opening holes of the shaft body 5 on the outer circumferential side.

The flow passage hole 63*a* in the shaft main body 51, the gap 63*b* of the corresponding sleeve 52, and the plurality of through-holes 63*c* are included in a third inner flow passage 63 through which cooling water corresponding to a liquid flows as the sealed fluid. In this way, the third inner flow passage 63 has the through-holes 63*c* used as opening holes of the shaft body 5 on the outer circumferential side.

The flow passage holes 64*a* in the shaft main body 51, the gap 64*b* of the corresponding sleeve 52, and the plurality of through-holes 64*c* are included in a fourth inner flow passage 64 through which air corresponding to a gas flows as the sealed fluid. In this way, the fourth inner flow passage 64 has the through-holes 64*c* used as opening holes of the shaft body 5 on the outer circumferential side.

As described above, the respective inner flow passages 61 to 64 have the through-holes 61*c* to 64*c* used as the opening holes of the shaft body 5 on the outer circumferential side. Therefore, one first inner flow passage 61, one second inner flow passage 62, one third inner flow passage 63, and one fourth inner flow passage 64 are formed in the shaft body 5 to open at different positions in the axial direction. In the present embodiment, the third inner flow passage 63 is open at a position on the lower side of the opening of the first inner flow passage 61, the opening of the second inner flow passage 62, and the opening of the fourth inner flow passage 64 in the axial direction.

A plurality of (six in the illustrated example) mechanical seals 7 is provided in the axial direction in an annular space A between the case body 2 and the shaft body 5. The plurality of mechanical seals 7 includes a mechanical seal for forming a first intermediate flow passage 41 connecting the first outer flow passage 31 and the first inner flow passage 61 to each other, a mechanical seal for forming a second intermediate flow passage 42 connecting the second outer flow passage 32 and the second inner flow passage 62 to each other, a mechanical seal for forming a third intermediate flow passage 43 connecting the third outer flow passage 33 and the third inner flow passage 63 to each other, and a mechanical seal for forming a fourth intermediate flow passage 44 connecting the fourth outer flow passage 34 and the fourth inner flow passage 64 to each other.

One sleeve 52A is disposed to face an inner circumferential side of a lower part of the second flange 22 in the axial direction, and the third inner flow passage 63 (through-holes 63*c*) which is open in the sleeve 52A and the third outer flow passage 33 which is open on the inner circumferential side of the second flange 22 are open at the same positions in the axial direction. Further, two mechanical seals 7A and 7B forming the third intermediate flow passage 43 are provided between the sleeve 52A and the fifth flange 22.

The third intermediate flow passage 43 is formed in an annular shape between each of the mechanical seals 7A and 7B and the sleeve 52A disposed therebetween and the second flange 22 facing the sleeve 52A. Further, by a sealing function of the first sealing surface 71*a* and the second sealing surface 72*a* of each of the mechanical seals 7A and 7B and an O-ring 74 provided on the outer circumferential side of the first seal ring 71 of each mechanicals seal 7A and 7B, the sealed fluid is prevented from leaking from the third intermediate flow passage 43 to the outside.

As described above, the third outer flow passage 33 and the third inner flow passage 63 are connected by the third intermediate flow passage 43 formed using the mechanical seals 7A and 7B adjacent in the axial direction. Further, one independent third fluid passage 13 includes the third outer flow passage 33, the third intermediate flow passage 43, and the third inner flow passage 63. Note that a branch flow passage branching from the intermediate portion of the third inner flow passage 63 and communicating with the third intermediate flow passage 43 is not formed in the shaft body 5 of the present embodiment.

One sleeve 52B is disposed to face an inner circumferential side of an upper part of the second flange 22 in the axial direction, and the fourth inner flow passage 64 (through-holes 64) opening in the sleeve 52B and the fourth outer flow passage 34 opening on the inner circumferential side of the second flange 22 are open at the same positions in the axial direction. Further, the two mechanical seals 7B and 7C forming the fourth intermediate flow passage 44 are provided between the sleeve 52B and the second flange 22. Note that the mechanical seal 7B is a mechanical seal forming the third intermediate flow passage 43 as described above and also serves as a mechanical seal forming the fourth intermediate flow passage 44.

The first seal ring 71 of each of the mechanical seals 7B and 7C is provided to have a gap between the first seal ring 71 and an outer circumferential surface of the corresponding sleeve 52B, and an annular gap flow passage 44*a* is formed between each first seal ring 71 and the sleeve 52B. The gap flow passage 44*a* communicates with the through-holes 64*c* of the sleeve 52B. Further, by a sealing function of the first and second sealing surfaces 71*a* and 72*a* of the mechanical seal 7B and a sealing function of the first and second sealing surfaces 71*a* and 72*a* of the mechanical seal 7C, the sealed fluid is prevented from leaking to the outside from the gap flow passage 44*a*.

Furthermore, an annular flow passage 44*b* is formed between the first seal rings 71 and 71 of the mechanical seals 7B and 7C, and the annular flow passage 44*b* connects the gap flow passage 44*a* and the fourth outer flow passage 34 to each other. Further, by a sealing function of the O-ring 74 provided between the outer circumferential surface of each first seal ring 71 and the inner circumferential surface of the protrusion 22*a* of the second flange 22, the sealed fluid is prevented from leaking to the outside from the annular flow passage 44*b*.

As described above, the sealed gap flow passage 44*a* and the annular flow passage 44*b* are interposed between the fourth outer flow passage 34 and the fourth inner flow passage 64, and these flow passages 44*a* and 44*b* are included in the fourth intermediate flow passage 44 connecting the fourth outer flow passage 34 and the fourth inner flow passage 64 to each other. In this manner, the fourth outer flow passage 34 and the fourth inner flow passage 64 are connected by the fourth intermediate flow passage 44 formed using the mechanical seals 7B and 7C adjacent in the axial direction. Further, one independent fourth fluid passage 14 includes the fourth outer flow passage 34, the fourth intermediate flow passage 44, and the fourth inner flow passage 64.

One sleeve 52C is disposed to face an inner circumferential side of a lower part of the third flange 23 in the axial direction, and the second inner flow passage 62 (through-holes 62) opening in the sleeve 52C and the second outer flow passage 32 opening on the inner circumferential side of the third flange 23 are open at the same positions in the axial direction. Further, the two mechanical seals 7D and 7E forming the second intermediate flow passage 42 are provided between the sleeve 52C and the third flange 23.

The first seal ring 71 of each of the mechanical seals 7D and 7E is provided to have a gap between the first seal ring 71 and an outer circumferential surface of the sleeve 52C, and an annular gap flow passage 42*a* is formed between each first seal ring 71 and the sleeve 52C. The gap flow passage 42*a* communicates with the through-holes 62*c* of the sleeve 52C. Further, by a sealing function of the first and second sealing surfaces 71*a* and 72*a* of the mechanical seal 7D and a sealing function of the first and second sealing surfaces 71*a* and 72*a* of the mechanical seal 7E, the sealed fluid is prevented from leaking to the outside from the gap flow passage 42*a*.

Furthermore, an annular flow passage 42*b* is formed between the first seal rings 71 and 71 of the mechanical seals 7D and 7E, and the annular flow passage 42*b* connects the gap flow passage 42*a* and the second outer flow passage 32 to each other. Further, an O-ring 74 is provided between the outer circumferential surface of each first seal ring 71 and the inner circumferential surface of the protrusion 23*a* of the third flange 23. The O-ring 74 prevents the sealed fluid from leaking to the outside from the annular flow passage 42*b*. Note that each first seal ring 71 is fit to the protrusion 23*a* of the third flange 23 through the O-ring 74 in an axially movable state.

As described above, the sealed gap flow passage 42*a* and the annular flow passage 42*b* are interposed between the second outer flow passage 32 and the second inner flow passage 62, and these flow passages 42*a* and 42*b* are included in the second intermediate flow passage 42 connecting the second outer flow passage 32 and the second inner flow passage 62 to each other. In this way, the second outer flow passage 32 and the second inner flow passage 62 are connected by the second intermediate flow passage 42 formed using the mechanical seals 7D and 7E that are adjacent in the axial direction. Further, one independent second fluid passage 12 includes the second outer flow passage 32, the second intermediate flow passage 42, and the second inner flow passage 62.

The first outer flow passage 31 and the first inner flow passage 61 are open at different positions in the axial direction (vertical direction) with the second intermediate flow passages 42 of the one second fluid passage 12 interposed therebetween on the outer circumferential side of the shaft body 5. In the present embodiment, the first outer flow passage 31 is open at a location on the lower side of the second intermediate flow passages 42 in the axial direction, and the first inner flow passage 61 is open on the upper side of the second intermediate flow passage 42 in the axial direction. Further, these openings are connected by the first intermediate flow passage 41. Therefore, one independent first fluid passage 11 includes the first outer flow passage 31, the first intermediate flow passage 41, and the first inner flow passage 61.

In the present embodiment, the first intermediate flow passage 41 of the first fluid passage 11 includes a first annular flow passage 41*a* formed in the annular space A to communicate with the opening of the first outer flow passage 31, a second annular flow passage 41*b* formed in the annular space A to communicate with the opening of the first inner flow passage 61, and a connecting flow passage 41*c* formed in the case body 2 to connect the first annular flow passage 41*a* and the second annular flow passage 41*b* to each other.

In the annular space A, the two mechanical seals 7C and 7D forming the first annular flow passage 41*a* are provided, and the two mechanical seals 7E and 7F forming the second annular flow passage 41*b* are provided.

Note that the mechanical seal 7C is a mechanical seal forming the fourth intermediate flow passage 44 as described above, and also serves as a mechanical seal forming the first annular flow passage 41*a*. Similarly, the mechanical seals 7D and 7E are mechanical seals forming the second intermediate flow passage 42 as described above, and also serve as mechanical seals forming the second annular flow passage 41*b*.

The first annular flow passage 41*a* is formed between the mechanical seals 7C and 7D and the third flange 23 facing the mechanical seals 7C and 7D, and the mechanical seals 7C and 7D communicating with the first outer flow passage 31 which is open on the inner circumferential side of the third flange 23 has a common second seal ring 72.

By a sealing function of the first and second sealing surfaces 71*a* and 72*a* of the mechanical seal 7C and the O-ring 74 provided on the outer circumferential side of the first seal ring 71 of the mechanical seal 7C, the sealed fluid is prevented from leaking from the lower side of the first annular flow passage 41*a* in the axial direction to the fourth intermediate flow passage 44 (gap flow passage 44*a*) formed on the inner circumferential side thereof.

In addition, by a sealing function of the first and second sealing surfaces 71*a* and 72*a* of the mechanical seal 7D and the O-ring 74 provided on the outer circumferential side of the first seal ring 71 of the mechanical seal 7D, the sealed fluid is prevented from leaking from the upper side of the first annular flow passage 41*a* in the axial direction to the second intermediate flow passage 42 (gap flow passage 42*a*) formed on the inner circumferential side thereof.

The second annular flow passage 41*b* is provided between the mechanical seals 7E and 7F and a sleeve 52D disposed therebetween, and the third flange 23 facing the sleeve 52D. In this way, the second annular flow passage 41*b* communicates with the first inner flow passage 61 (through-hole 61*c*) which is open on the outer circumferential side of the shaft body 5.

By a sealing function of the first and second sealing surfaces 71*a* and 72*a* of the mechanical seal 7E and the O-ring 74 provided on the outer circumferential side of the first seal ring 71 of the mechanical seal 7E, the sealed fluid is prevented from leaking from the lower side of the second annular flow passage 41*b* in the axial direction to the second intermediate flow passage 42 (gap flow passage 42*a*) formed on the inner circumferential side thereof.

In addition, by a sealing function of the first and second sealing surfaces 71*a* and 72*a* of the mechanical seal 7F and the O-ring 74 provided on the outer circumferential side of the first seal ring 71 of the mechanical seal 7F, the sealed fluid is prevented from leaking to the outside from the upper side of the second annular flow passage 41*b* in the axial direction.

The connecting flow passage 41*c* on the case body 2 side includes a flow passage hole formed to penetrate the protrusion 23*a* of the third flange 23 in the axial direction, and connects the upper end portion of the first annular flow passage 41*a* and the lower end portion of the second annular flow passage 41*b* to each other. That is, the first outer flow passage 31 and the first inner flow passage 61 are connected via the first annular flow passage 41*a*, the connecting flow passage 41*c*, and the second annular flow passage 41*b* in order from the bottom.

In this way, the cooling water (sealed fluid) flowing through the first intermediate flow passage 41 of the first fluid passage 11 lubricates and cools the first and second sealing surfaces 71a and 72a of each of the mechanical seals 7D to 7E forming the second intermediate flow passage 42.

Specifically, the cooling water flowing through the first annular flow passage 41a of the first intermediate flow passage 41 lubricates and cools the first and second sealing surfaces 71a and 72a of the mechanical seal 7D forming the second intermediate flow passage 42. In addition, the cooling water flowing through the second annular flow passage 41b of the first intermediate flow passage 41 lubricates and cools the first and second sealing surfaces 71a and 72a of the mechanical seal 7E forming the second intermediate flow passage 42.

Note that the cooling water flowing through the first annular flow passage 41a lubricates and cools the first and second sealing surfaces 71a and 72a of one mechanical seal 7C forming the fourth intermediate flow passage 44. In addition, the cooling water (sealed fluid) flowing through the third intermediate flow passage 43 of the third fluid passage 13 lubricates and cools the first and second sealing surfaces 71a and 72a of the other mechanical seal 7B forming the fourth intermediate flow passage 44.

An omitted description in the second embodiment is similar to that of the first embodiment.

As described above, according to the rotary joint 1 of the present embodiment, in the first fluid passage 11 through which the liquid (cooling water) flows, the opening of the first outer flow passage 31 on the case body 2 side and the first inner flow passage 61 on the shaft body 5 side are open at mutually different positions in the axial direction with the second intermediate flow passage 42 of the second fluid passage 12 through which gas (air) flows interposed therebetween. Further, the first intermediate flow passage 41 connecting the opening of the first outer flow passage 31 and the opening of the first inner flow passage 61 to each other is formed such that the liquid flowing through the first intermediate flow passage 41 lubricates the first and second sealing surfaces 71a and 72a of the mechanical seals 7D to 7E forming the second intermediate flow passage 42. In this way, it is possible to lubricate the first and second sealing surfaces 71a and 72a of the mechanical seals 7D to 7E forming the second fluid passage 12 (second intermediate flow passage 42) through which a gas flows using the liquid flowing through the one first fluid passage 11 (first intermediate flow passage 41).

In addition, the first intermediate flow passage 41 of the first fluid passage 11 can be formed by a simple configuration in which the first annular flow passage 41a communicating with the opening of the first outer flow passage 31 and the second annular flow passage 41b communicating with the opening of the first inner flow passage 61 are connected by the connecting flow passage 41c.

[Others]

The rotary joint 1 in each of the above embodiments may be disposed upside down in the axial direction, or may be disposed such that the axial direction corresponds to a horizontal direction.

In addition, in the rotary joint 1 in each of the above embodiments, the first fluid passage 11 is used as a fluid passage that sends the liquid to the rotating side member of the CMP device, and the third fluid passage 13 is used as a fluid passage that collects the liquid from the rotating side member. However, the first fluid passage 11 may be used as a fluid passage that collects the liquid from the rotating side member, and the third fluid passage 13 may be used as a fluid passage that sends the liquid to the rotating side member. In this case, the first outer flow passage 31 serves as a discharge flow passage that discharges the liquid to the outside from the inside of the case body 2, and the first inner flow passage 61 serves as a supply flow passage that supplies the liquid into the shaft body 5 from the outside. In addition, the third outer flow passage 33 serves as a supply flow passage that supplies the liquid into the case body 2 from the outside, and third inner flow passage 63 serves as a discharge flow passage that discharge the liquid from the inside of the shaft body 5 to the outside.

The rotary joint 1 in each of the above embodiments can be applied to other devices such as a sputtering device and an etching device other than the CMP device. In this case, the rotary joint 1 may not include the third fluid passage 13. Further, the rotary joint 1 is not limited to use in the semiconductor field.

In the first embodiment, the first outer flow passage 31 and the first inner flow passage 61 are open at different positions in the axial direction with the three second intermediate flow passages 42 interposed therebetween. However, it is sufficient that the first outer flow passage 31 and the first inner flow passage 61 are open at different positions in the axial direction with at least one second intermediate flow passage 42 interposed therebetween. Note that when the first outer flow passage 31 and the first inner flow passage 61 are open at different positions in the axial direction with two second intermediate flow passages 42 interposed therebetween, the connecting flow passage 41c connecting the first annular flow passage 41a and the second annular flow passage 41b in the first intermediate flow passage 41 to each other may include one third annular flow passage and two flow passage holes.

In the second embodiment, the first outer flow passage 31 and the first inner flow passage 61 are open at different positions in the axial direction with one second intermediate flow passage 42 interposed therebetween in the annular space A. However, the first outer flow passage 31 and the first inner flow passage 61 may be opened at different positions in the axial direction with a plurality of second intermediate flow passages 42 interposed therebetween.

In addition, the rotary joint 1 of the second embodiment may not include the fourth fluid passage 14.

The embodiments disclosed this time are examples in all respects and are not restrictive. The scope of the invention is indicated by the claims rather than the above meaning, and is intended to include meanings equivalent to the claims and all modifications within the scope.

REFERENCE SIGNS LIST 1 rotary joint
2 case body
5 shaft body
7 mechanical seal
11 first fluid passage
12 second fluid passage
13 third fluid passage
15 branch flow passage
31 first outer flow passage (supply flow passage)
32 second outer flow passage
33 third outer flow passage (discharge flow passage)
41 first intermediate flow passage
41a first annular flow passage
41b second annular flow passage
41c connecting flow passage
41d, 41e third annular flow passage
41f, 41g, 41h flow passage hole
42 second intermediate flow passage
43 third intermediate flow passage 61 first inner flow passage (discharge flow passage)
62 second inner flow passage
63 third inner flow passage (supply flow passage)
71 first seal ring
71a first sealing surface
72 second seal ring
72a second sealing surface
A annular space

The invention claimed is:

1. A rotary joint comprising a first fluid passage through which a liquid flows and a second fluid passage through which a gas flows, the rotary joint further comprising:
   a tubular case body formed by each of a first outer flow passage through which a liquid flows and a second outer flow passage through which a gas flows opening on an inner circumferential side;
   a shaft body provided to be relatively rotatable in the case body and formed by each of a first inner flow passage through which a liquid flows and a second inner flow passage through which a gas flows opening on an outer circumferential side; and
   a plurality of mechanical seals provided in an axial direction in an annular space between the case body and the shaft body to form a first intermediate flow passage that connects the first outer flow passage and the first inner flow passage to each other and configure the second fluid passage by forming a second intermediate flow passage that connects the second outer flow passage and the second inner flow passage to each other,
   wherein each of the mechanical seals includes a first seal ring which is attached to the case body and on which a first sealing surface is formed, and a second seal ring which is attached to the shaft body and on which a second sealing surface coming into sliding contact with the first sealing surface is formed,
   the first fluid passage includes the first outer flow passage and the first inner flow passage opening at mutually different positions in the axial direction with the second intermediate flow passage interposed therebetween, and the first intermediate flow passage connecting an opening of the first outer flow passage and an opening of the first inner flow passage to each other, and
   the first intermediate flow passage is formed such that a liquid flowing through the first intermediate flow passage lubricates first and second sealing surfaces of the mechanical seals forming the second intermediate flow passage.

2. The rotary joint according to claim 1,
   wherein the first intermediate flow passage includes
   a first annular flow passage formed using some of the plurality of mechanical seals in the annular space to communicate with the opening of the first outer flow passage,
   a second annular flow passage formed using some other mechanical seals among the plurality of mechanical seals in the annular space to communicate with the opening of the first inner flow passage, and
   a connecting flow passage connecting the first annular flow passage and the second annular flow passage to each other.

3. The rotary joint according to claim 1,
   wherein a plurality of second outer flow passages is formed in the axial direction in the case body,
   the same number of second inner flow passages as the number of second outer flow passages are formed in the shaft body,
   the plurality of mechanical seals includes a mechanical seal that forms the second intermediate flow passage connecting the second outer flow passages and the second inner flow passages one by one in the annular space to configure a plurality of second fluid passages,
   the first outer flow passage and the first inner flow passage are open at mutually different positions in the axial direction with the plurality of second intermediate flow passages interposed therebetween, and
   the first intermediate flow passage is formed such that a liquid flowing through the first intermediate flow passage lubricates first and second sealing surfaces of the mechanical seal forming the plurality of second intermediate flow passages.

4. The rotary joint according to claim 3,
   wherein the first intermediate flow passage includes
   a first annular flow passage formed using some of the plurality of mechanical seals in the annular space to communicate with the opening of the first outer flow passage,
   a second annular flow passage formed using some other mechanical seals among the plurality of mechanical seals in the annular space to communicate with the opening of the first inner flow passage, and
   a connecting flow passage connecting the first annular flow passage and the second annular flow passage to each other, and
   the connecting flow passage includes
   a third annular flow passage formed using the mechanical seal forming the plurality of second inner flow passages between the first annular flow passage and the second annular flow passage of the annular space, and
   a plurality of flow passage holes formed in the case body to connect the first annular flow passage and the second annular flow passage through the third annular flow passage.

5. The rotary joint according to claim 3,
   wherein the first outer flow passage is a supply flow passage that supplies a liquid into the case body from an outside,
   the first inner flow passage is a discharge flow passage that discharges a liquid from an inside of the shaft body to an outside, and
   the case body and the shaft body are disposed with the axial direction as a vertical direction such that the opening of the first outer flow passage is located below the opening of the first inner flow passage.

6. The rotary joint according to claim 5,
   wherein a third inner flow passage serving as a supply flow passage that supplies a liquid into the shaft body from the outside is formed in the shaft body to open on an outer circumferential side,
   a third outer flow passage serving as a discharge flow passage that discharges a liquid from the inside of the case body to the outside is formed in the case body to open on an inner circumferential side,
   the plurality of mechanical seals includes a mechanical seal that forms a third intermediate flow passage connecting the third outer flow passage and the third inner flow passage to each other in the annular space to configure a third fluid passage, and
   the third inner flow passage is open at a position on an upper side of the opening of the first inner flow passage in the axial direction in the shaft body.

7. The rotary joint according to claim 6, wherein a branch flow passage branching from an intermediate portion of the third inner flow passage and communicating with an upper end portion of the third intermediate flow passage in the axial direction is formed in the shaft body.

8. The rotary joint according to claim 1,
wherein the opening of the first outer flow passage communicates with the first intermediate flow passage alone, and
the opening of the first inner flow passage communicates with the first intermediate flow passage alone.

\* \* \* \* \*